USOO5347541A

United States Patent [19]
Iltis et al.

[11] Patent Number: 5,347,541
[45] Date of Patent: Sep. 13, 1994

[54] APPARATUS AND METHOD FOR UTILIZING A BLIND EQUALIZER BASED ON A BAYESIAN SYMBOL SEQUENCE ESTIMATOR FOR USE IN DIGITAL COMMUNICATION

[75] Inventors: Ronald A. Iltis; John J. Shynk, both of Goleta, Calif.

[73] Assignee: The Regents of the Univ. of California, Oakland, Calif.

[21] Appl. No.: 969,901

[22] Filed: Nov. 2, 1992

[51] Int. Cl.⁵ .............................................. H03H 7/30
[52] U.S. Cl. ........................................ 375/12; 375/14; 364/724.20
[58] Field of Search ...................... 375/12, 14, 15, 101; 364/724.19, 724.20

[56] References Cited

U.S. PATENT DOCUMENTS

| | | | |
|---|---|---|---|
| 4,821,288 | 4/1989 | Peile | 375/11 |
| 4,847,797 | 7/1989 | Picchi et al. | 375/15 |
| 4,995,057 | 2/1991 | Chung | 375/13 |

*Primary Examiner*—Stephen Chin
*Assistant Examiner*—T. Ghebretinsae
*Attorney, Agent, or Firm*—Daniel L. Dawes

[57] ABSTRACT

A Bayesian blind equalizer which approximates the optimum symbol-by-symbol detector for an unknown intersymbol interference pattern in a communication channel is provided in a plurality of parallel processors. Each processor operates in parallel from a common data bus with each of the other processors. Each of the processors in turn generates an estimated signal and updated metric for the communication channel for a corresponding one of each of the possible data subsequences which could cause intersymbol interference. The estimated signals or innovations are then combined with the updated metrics in a supervisory processor to generate unconditional channel coefficients for the next received data sample. Using the estimated channel coefficients and received data samples, the transmitted data sample is reliably decoded notwithstanding intersymbol interference without the use of data preambles or training data and notwithstanding that the channel coefficients may be rapidly varying.

20 Claims, 6 Drawing Sheets

APPARATUS AND METHOD FOR UTILIZING A BLIND EQUALIZER BASED ON A BAYESIAN SYMBOL SEQUENCE ESTIMATOR FOR USE IN DIGITAL COMMUNICATION

BACKGROUND OF THE INVENTION

1. Field of the Invention

The invention relates to the field of digital communication and in particular to circuits and methods for correcting for multipath interference or intersymbol interference in digital communication channels.

2. Description of the Prior Art

In any type of communication channel, whether it be by wire or radio transmission, the digital information waveform becomes smeared or spread in time so that the bits or data become at least partially superimposed on each other in the received signal. In the case of cellular telephones, this may occur as a result of the transmitted signal reaching the receiving station by a multiple number of paths, each having substantially different path lengths. In other types of communication channels, data smearing can occur due to bandwidth limitations. To add to the complexity, the physical causes of data smearing in communication channels is time dependent.

Therefore, the prior art has developed equalizers for sorting out the true signal from the data smeared signal. These circuits must be able to perform their iterative functions to converge quickly to a unique solution and to do so in a manner which will rapidly track the time variations of the channel communication characteristics.

The prior art has used recursive least squares methodologies employed in adaptive equalizers for this purpose. See, M. S. Mueller, *"Least-Squares Algorithms for Adaptive Equalizers"*; Bell Systems Technical Journal, Vol. 60, (October, 1991). However, recursive least-squares methods require some type of training using a known data sequence or a data preamble in combination with a decision directed adaptation. In systems in which there is a time-division multiple access (TDMA) systems such as that proposed for cellular telephones, the channel estimation or equalization problem is particularly difficult, since only a very short preamble is available for equalizer training and the channel characteristics vary greatly from one communication time slot to the next.

The use of Bayesian blind equalizers which approximate the optimum symbol-by-symbol detector for unknown intersymbol interference (ISI) channels is known. For a discussion of the class of algorithms of this type, see for example, R. A. Iltis el.al., *"Recursive Bayesian Algorithms for Blind Equalization"*, Proceedings of the Asilomar Conference on Signals, Systems and Computers, Pacific Grove, Calif., pp. 710-15 (November, 1991); and K. Giridhar et.al., *"Bayesian/Decision-Feedback Algorithm for Blind Adaptive Equalization"*; Optical Engineering, Vol. 31, pp 1211-23 (1992), both incorporated herein by reference. These methodologies employ parallel structures well suited to very large scale integration. Furthermore, the Bayesian equalizers implement the methodology extremely rapidly, e.g. within as few as 20 data symbols when Kalman filter channel estimators are employed, and can track rapid variations (large Doppler spread) in the effective channel coefficients.

In contrast, known blind equalization methodologies, i.e. those that do not require preambles or training, such as constant modulus methodologies as described by J. R. Treichler et.al., *"A New Approach to Multipath Correction of Constant Modulus Signals"*; IEEE Transactions on Acoust. Speech and Sig. Proc., Vol. ASSP-31, pp. 459-72 (1983) and the Bussgang type techniques typically require thousands of data symbols in order to converge to a unique solution. Furthermore, constant modulus methodologies and the Bussgang methodologies only partially open the eye of the intersymbol interference channel and once the open eye condition is met, the blind equalizer of the prior art must be switched off and a conventional decision feedback equalizer turned on to obtain adequate bit error rate performance. Furthermore conventional decision feedback equalizers are prone to catastrophic error propagation particularly when the channel characteristics are rapidly changing. Still further, conventional decision feedback equalizers are incapable of blind start up and require transmission of the training sequence if a separate blind equalization methodology is not available.

What is needed is a Bayesian blind equalizer which can assume dynamic channel control and provide a performance approaching that of an optimum symbol-by-symbol detector. What is further needed is a Bayesian equalizer that can operate continuously providing both blind start up and tracking of time varying channels.

Therefore, what is needed is some type of blind equalization that can be performed without the use of a preamble or training, which can be effectively implemented even when the communication channel characteristics vary rapidly, and which converges rapidly to a unique decision and solution without a large number of data symbols being required.

BRIEF SUMMARY OF THE INVENTION

A Bayesian blind equalizer which approximates the optimum symbol-by-symbol detector for an unknown intersymbol interference pattern in a communication channel is provided in a plurality of parallel processors. Each processor operates in parallel from a common data bus shared by the other processors. Each of the processors in turn generates an estimated signal and updated probability metric for the communication channel for a corresponding one of each of the possible data subsequences which could cause intersymbol interference. The estimated signals or innovations are then combined with the updated metrics in a supervisory processor to generate unconditional channel coefficients for the next received data sample. Using the estimated channel coefficients and received data samples, the transmitted data sample is reliably decoded notwithstanding intersymbol interference, without the use of data preambles or training data, and notwithstanding that the channel coefficients may be rapidly varying.

More specifically the invention is an apparatus for performing blind equalization of digital waveforms received over a communication channel comprising a memory for storing every possible data subsequence in which intersymbol interference could occur and for storing updated channel coefficients. A first data bus is coupled to the memory for communicating received data signals, stored data subsequences and stored communication channel coefficients. A plurality of signal processors are each coupled in parallel to the first data bus. Each processor generates estimated received data signals and updated estimated communication channel coefficients. Each processor generates the estimated received data signals and estimated communication channel coefficients for one of the stored possible data subsequences. A second data bus is coupled in parallel to the plurality of signal processors for communicating the estimated data signals and updated communication channel coefficients. A central processing circuit is coupled to the first and second data buses for controlling operation of the first and second data buses and the plurality of signal processors, for estimating unconditional channel coefficients, for storing the estimated unconditional channel coefficients in the memory, and for decoding the received data according to a Bayesian estimation scheme based on the estimated signals and updated communication channel coefficients for each of the stored possible subsequences. As a result, the received data which is subject to data smearing is reliably decoded notwithstanding intersymbol interference and without the use of training data or signaling preambles.

In one embodiment the central processing circuit comprises a supervisory processor and an address bus coupled to the supervisory processor and memory for communication therebetween.

The memory is comprised of a read only memory for storing the plurality of sets of data subsequences and a random access memory for temporarily storing the unconditional channel coefficient estimates.

Each of the signal processors comprises a circuit for computing an estimated received value (innovation) for each one of the predetermined number of possible data subsequences.

Each of the signal processors further comprises a corresponding channel estimator for computing a normalized least squares update of the channel coefficient estimates read from the first data bus.

The apparatus is used in combination with a transmitter and each of the signal processors further comprises a read only memory (g-ROM) for storing a corresponding pulse function, g(t), corresponding to the transmitter.

The predetermined number is four and wherein four of the signal processors comprise the plurality of parallel signal processors.

The invention is also characterized as a method for communicating digital information in a communication channel subject to intersymbol interference by using blind equalization comprising the steps of receiving a sample r(k) and determining the likelihood of having received the sample given a possible data sample sequence and given a sequence of prior received samples. The likelihood is $p(r(k)|d_i^{k,L}, r^{k-1})$ for each possible data subsequence. $d_i^{k,L}$. The probability that the sequence of data signals possibly received given the received samples including the presently received sample is updated. The updated metric is $P(d_i^{k,L}|r^k)$. The updated channel coefficient corresponding to the communication channel is conditionally estimated for each possible data subsequence of possible intersymbol interfering samples. The channel coefficients for the communication channel for each next possible subsequence, $d_i^{k+1,L}$, are unconditionally estimated for every possible intersymbol interfering received sample for the next received data sample. The next data sample, r(k+1), is then received and the process is repeated. As a result, data may be decoded notwithstanding intersymbol interference without the use of data preambles or training data.

The method further comprises the step of decoding the transmitted data sequence from the received data sequence by selecting the oldest received data symbol from the most probable data subsequence when the oldest received data symbol can no longer be involved in intersymbol interference.

The steps of updating the probability that the sequence of data signals possibly received given the received samples including the presently received sample, and the step of conditionally estimating the updated channel coefficient corresponding to the communication channel for each possible data subsequence of possibly intersymbol interfering samples are simultaneously performed for each possible data subsequence, $d_i^{k,L}$.

The invention can be better visualized by now turning to the following drawings wherein like elements are referenced by like numerals.

The invention in its various embodiments can now be understood by turning to the following detailed description.

DETAILED DESCRIPTION OF THE PREFERRED EMBODIMENTS

In the illustrated embodiment, what is described is a Bayesian blind equalizer circuit and methodology which has application in all types of communication channels and is particularly adapted for use in time-division multiple access mobile digital radio. The illustrated bit rate is 16 kilobits per second although it is anticipated that much higher bit rates can be accommodated. The Bayesian equalizer of the invention uses up to four parallel adaptive channel estimators each of which have an operation based on a normalized least-squares method of operation. The bank of channel estimators is implemented in a high speed integrated circuit. A programmable digital signal processing device is employed as a supervisory circuit and is used to generate metric updates for final symbol decisions. It is also entirely within the scope of the invention that the programmable digital single processor will be replaced by a custom logic integrated circuit processor for implementing in hardware the signal processing described below.

Consider first a simplified illustration of the problem. A driver driving down the freeway uses a cellular, low power phone to contact a cellular base station a few miles away. The communication channel is generally line of sight, but the base station also receives a number of reflected signals from the car phone. The car phone does not have a directional antenna for the least reason of which the user has no idea where the base station is.

The car phone transmits its signal therefore in every direction. Additional paths or signal traces of the transmitted message may, for example, bounce off a passing overpass, a nearby high rise building, an oncoming eighteen wheeler, a passing cloud etc.. All these signals of the original transmission arrive at slightly different times at the base station. The resulting degradation in an analog voice signal may be a slight echo, noise, and loss of sound quality. Recipients of current cellular car phone calls are familiar with the poor quality sometimes encountered in such calls. The poor quality is acceptable, because the human brain is still one of the world's best computers for picking out data patterns or meaningful information, i.e. the caller's voice, from noisy signals. The problem becomes exacerbated however when you attempt to transmit digital data to a nonintelligent computer. If it looks like a 1 or 0, the ordinary computer has no way of picking out the meaningful 1's and 0's from those which shouldn't be there. Everything the computer receives is equally meaningful, therefore in a bad channel, nothing becomes meaningful. The message will be hopelessly garbled. If the receiving computer had some way of picking out the meaning or true signal, then we could carry on conversations on cellular car phones with near perfect digital quality sound, in stereo if desired.

In very simplified terms the invention solves this problem without having any information whatsoever about how bad or what the communication channel is doing to corrupt the signal, but makes its best guess for each possible logical signal which could have been transmitted. The invention guesses what the communication is doing to corrupt the signal. At first the guess is a wild one, but the invention quickly corrects it to make better and better guesses. Guessing how the data is being corrupted, the invention deduces what it would expect to receive for every possible logical signal which could have been sent and possibly subject to corruption. This estimated received signal is compared in parallel processors against what was actually received for each possible transmitted sequence of data. The errors revealed by the comparison are then used to make an improved guess as to what the communication channel is doing to the data. This is termed an updating of the effective channel coefficients. Based on the new guess for the data corruption a new expected received signal is estimated for the next data symbol received, again for every possible logical sequence of data which could have been sent and subject to corruption.

The process continues with each new data symbol and the guesses are improved each time. Even more desirable, the guesses very quickly and naturally track the changes in the communication channel's behavior. When the car zooms by the base station and the Doppler effect corrupts the received data, the invention sees it and automatically accounts for it. Eventually enough time passes since the data was transmitted that no better information can be obtained with respect to what the communication channel was doing to it when it was sent. At that point the invention has attached a probability to each possible logical sequence of data that could have been sent based on its degree of match to the actually received signal. The oldest data symbol in the most probable data sequence is then chosen as the most likely data symbol that was sent at that time. Thus, symbol by symbol the true or very likely the true data transmission is divined from the received signal notwithstanding how bad the data channel is, how it changes, or whether the receiving station has any knowledge of the quality of the data channel or nature of the data being sent to it. If in fact the receiving channel makes a bad guess as to the data, the error is restricted to the one bad data symbol and is not propagated because the estimated data is constantly being revised based on a constantly revised estimate of how bad the channel is for every possible data sequence that ever could have been sent and been corrupted.

Figure 1:
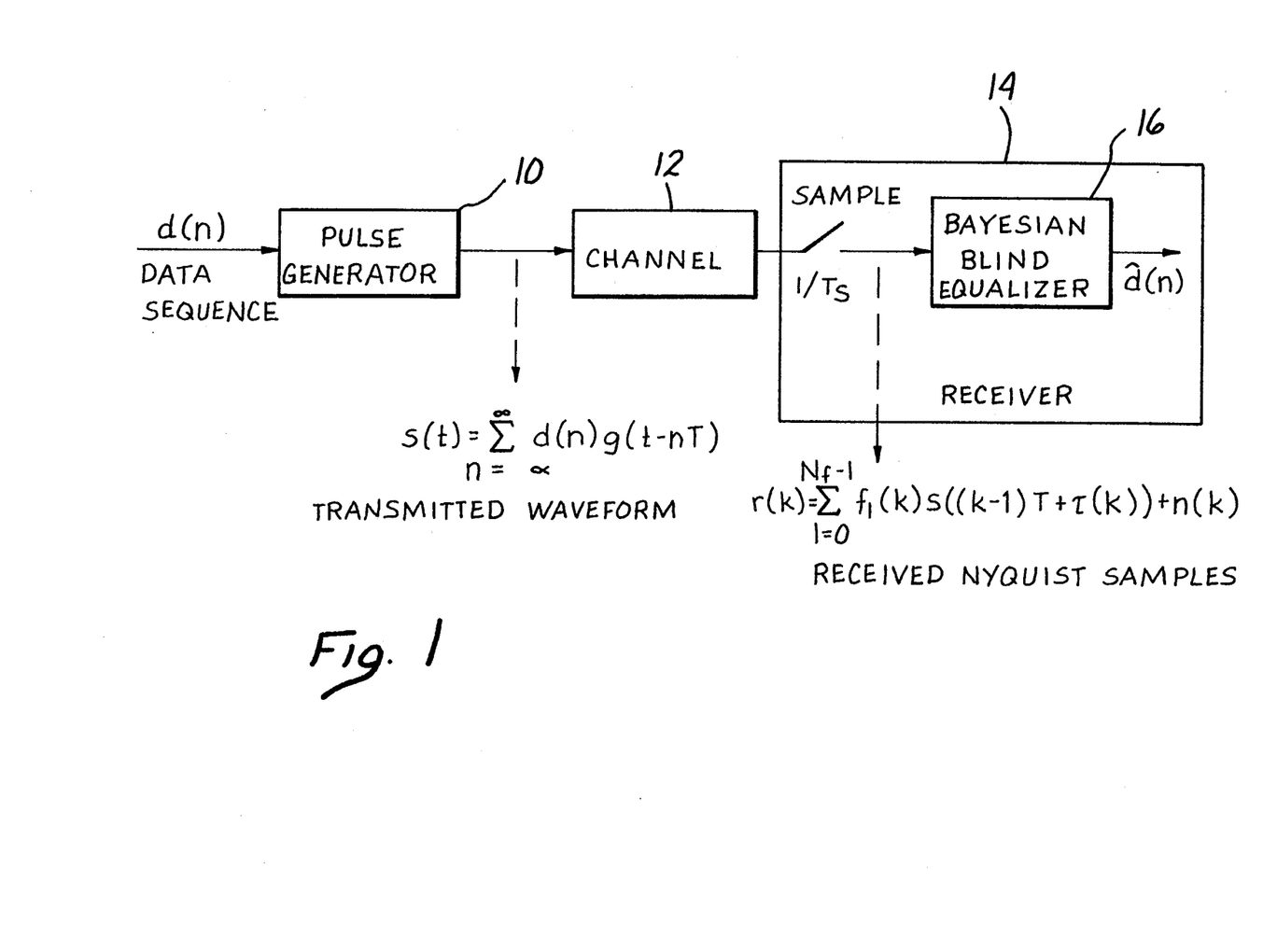
FIG. 1 is a block diagram of a communication system in which the invention is employed.

Before considering the circuitry of the invention, first consider the methodology which is implemented in it in the general communication scenario of the illustrated embodiment. FIG. 1 is a highly idealized block diagram of the communication scenario. A data sequence, d(n), is generated in a transmitter 10. In the illustrated embodiment, the transmitter waveform in general is comprised of a sequence of quadrature amplitude modulated pulses corresponding to the data sequence d(n). Any data format now known or later devised may be used. These pulses are transmitted by wire or wireless though a channel 12. Channel 12 can be modelled as essentially a tapped-delay line or in discrete time, a finite impulse response filter. The receiver 14 can generally be thought of as a Nyquist sampler with an anti-aliasing filter (not shown) in combination with a Bayesian blind equalizer 16. The Bayesian equalizer 16 is described in greater detail below in connection with FIG. 2. Again the exact nature of the transmitter, channel or receiver is not critical to an understanding of the invention or to its operability.

The transmitted waveform in the model of FIG. 1 is modelled by Equation 1 where d(n) is a complex-valued data sequence for quadrature amplitude modulated pulses and g(t) is a bandwidth efficient pulse, such as a raised cosine pulse.

$$s(t) = \sum_{n=-\infty}^{+\infty} d(n) g(t - nT) \quad (1)$$

where t is time and T the period of a single data symbol. If d(n) is transmitted as binary phase shifted keyed pulses, it takes on the values + or −1. If quadrature phase shift keyed pulses instead are used, then d(n) is a series of complex numbers taking on the four possible values + or −1, and + or −j.

In FIG. 1, transmitter 10 multiplies the pulse generator input, g(t), by the current data symbol, d(n), and then upconverts the baseband signal of Equation 1 into a transmission frequency for communication over channel 12.

Channel 12 may, for example, be a subscriber-loop telephone line with voice band modems, or a radio frequency channel in a mobile, time division multiple access (TDMA) system. In many applications, channel 12 can be modeled as a time varying digital filter with an impulse response, h(k, n), given by Equation 2 below, where $\delta(k)$ is a unit impulse, $f_l(k)$ the channel coefficients describing the behavior of channel 12, and $N_f$ represents the number of data symbols or data periods in which intersymbol interference can practically be expected.

$$h(k, n) = \sum_{l=0}^{N_f-1} f_l(k) \delta(n - 1) \quad (2)$$

In general, only $N_f-1$ past data symbols of the data sequence d{n}, would interfere with or be spread over the detection of the currently transmitted symbol, d(n). $N_f$ is determined by the characteristics of channel 12. In many practical embodiments such as normal TDMA, $N_f$ can be practically and safely treated as equal to 4, in other words, typically no more than three prior digital pulses will spread to interfere with current pulse being transmitted.

The Nyquist sample is received by digital receiver 14 after down-conversion to baseband and is modelled by the sequence r(k) described as a complex valued series in Equation 3 below, where $f_l(k)$ are the time varying channel coefficients in Equation 2, $\tau(k)$ is the symbol timing jitter, and the additive sequence, n(k), represents a combination of receiver internal amplifier and channel noise which is typically modeled as white Gaussian noise.

$$r(k) = \sum_{l=0}^{N_f-1} f_l(k) s[(k-1)T + \tau(k)] + n(k) \quad (3)$$

It will be helpful in understanding the methodology to be able to refer to and bear in mind that certain data subsequences and cumulative data sequences are received or transmitted as defined below in Equation 4.

$$\begin{aligned} r^k \text{ is the set } &\{r(k), r(k-1), \ldots, r(0)\} \\ d_i^k \text{ is the set } &\{d_i(k), d_i(k-1), \ldots, d_i(0)\} \\ d_i^{k,L} \text{ is the set } &\{d_i(k), d_i(k-1), \ldots, d_i(k-L+1)\} \end{aligned} \quad (4)$$

The cumulative sequence, $r^k$, represents all Nyquist samples actually received from a start time, k=0, to the present time, k. The cumulative sequence, $d_i^k$, represents the ith sequence of all logically possible data sequences beginning from the start time to the present. For example, in the case of a binary signal across two time periods, k=0 to 1, there are four possible sequences, $d_i^1$, namely {0, 0}, {1, 0}, {0, 1} and {1, 1}. In general in binary signaling, there will be $2^k$ logically possible cumulative sequences for $d_{ik}$. The subsequence $d_i^{k,L}$ represents the data symbols directly contributing to intersymbol interference. Typically, L is equal to $N_{f+1}$ since there is an uncertainty in timing which adds an additional symbol duration to possible intersymbol interference. As discussed above, where $N_f$ is practically treated as equal to 4, in the practical sequences contemplated, L=5. For binary signaling for example, in general there would be $2^L$ such subsequences of data bits which would be bit sequences which logically could have been present and contributed to the intersymbol interference.

The output of Bayesian equalizer 16 in FIG. 1 is a set of maximum *a posteriori* metrics or probabilities for each of the possible subsequences, $d_i^{k,L}$, representing sequences which could have been transmitted and possibly corrupted. The probability set forth in Equation 5 below is the metric update or conditional probability which is optimum when the transmission characteristics of channel 12 is known *a priori*.

$$P(d_i^{k,L}|r^k) = (1/c)p[r(k)|d_i^{k,L}, r^{k-1}] \sum_{j:\, d_j^{k-1,L} \in d_i^{k,L}} P(d_j^{k-1,L}|r^{k-1}) \quad (5)$$

where c is a normalization constant. Equation 5 is equivalent to the methodologies discussed by Abend and Fritchman to describe a maximum a posteriori symbol-by-symbol detector. See R. A. Iltis, "*Recursive Bayesian Algorithms for Blind Equalization*", supra previously incorporated by reference. Equation 5 is the equation for the probability that a particular sequence of data, $d_i^{k,L}$, was transmitted given that the currently received sequence of data is given by the set $r^k$. The summation is taken over all subsequences such that the first L−1 symbols in the subsequence, $d_j^{k-1,L}$, are the same as the last L−1 symbols in the subsequence $d_i^{k,L}$. In other words, the summation is taken over all the logical possible data subsequences just prior to the currently transmitted data interval which match the possible subsequence of data currently transmitted.

Figure 3A:
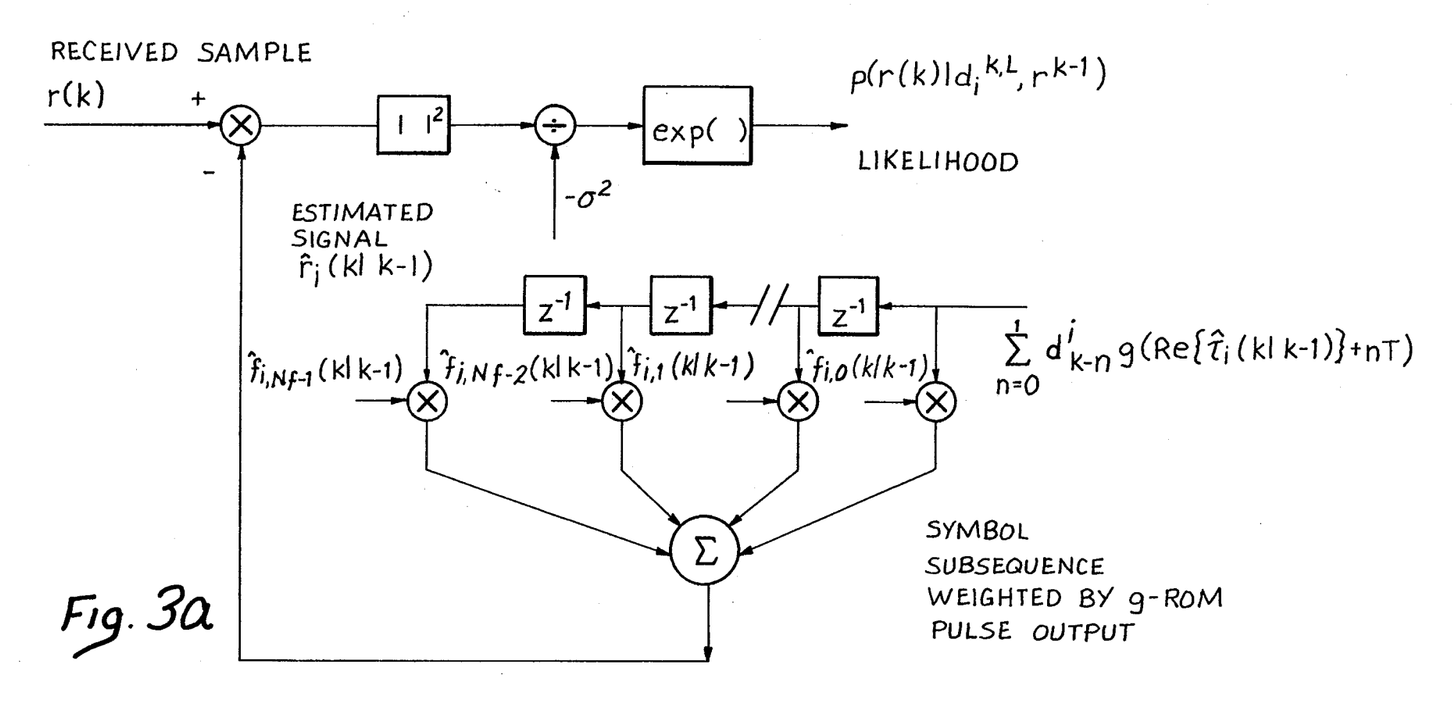
FIG. 3a is a diagrammatic drawing of a method and means for generating both an estimated signal and an updated likelihood of a data symbol given a prior sequence and received signal.
Figure 3B:
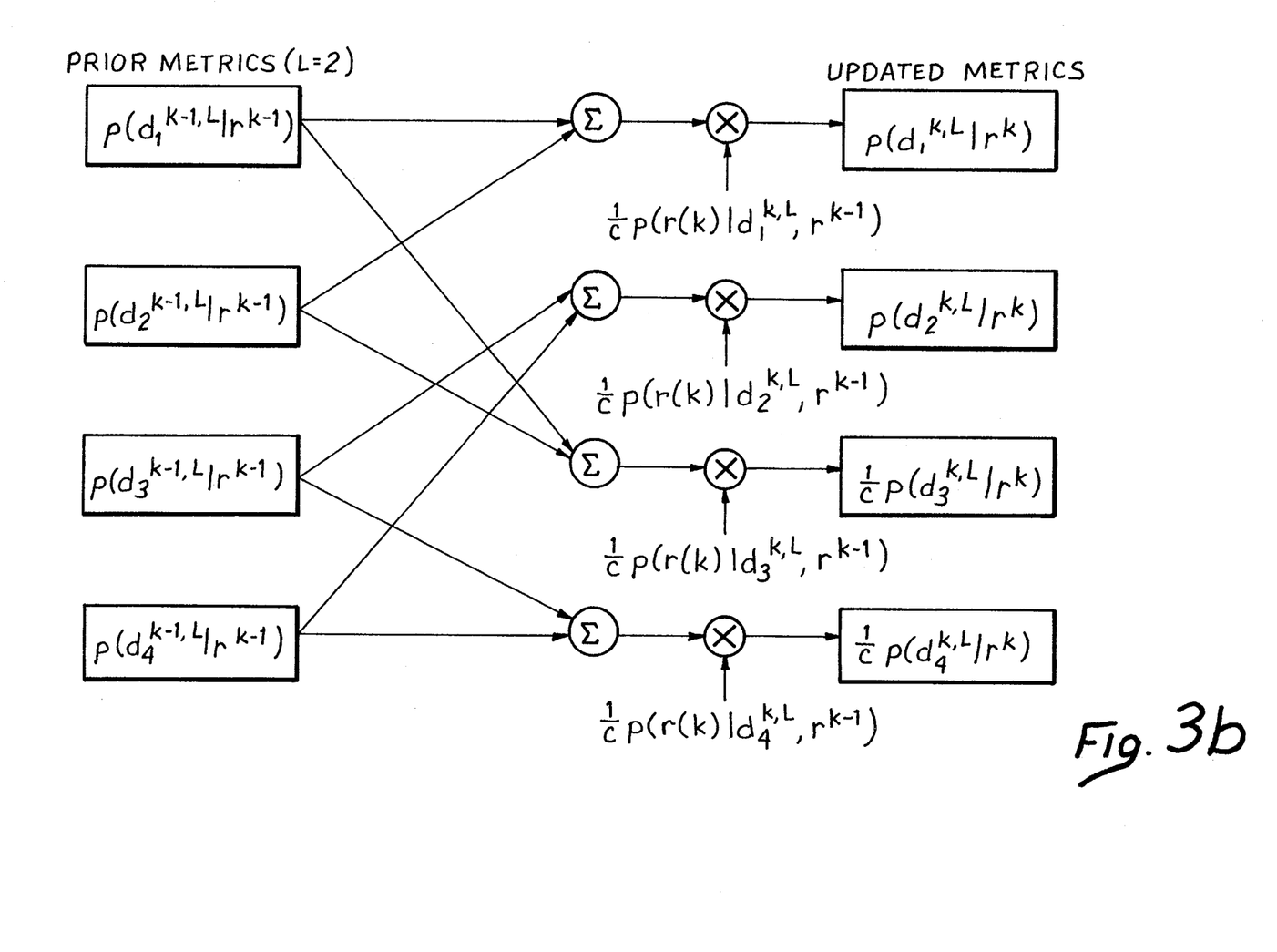
FIG. 3b is a diagrammatic drawing of a method and means for generating an updated metric.

FIG. 3b is a diagrammatic drawing of a method and means for generating an updated metric according to equation (5) above.

When the characteristics of channel 12 are unknown, the update Equation 5 is approximated with the likelihood or gaussian distribution density, $p(r(k)|d_i^{k,L}, r^{k-1})$ given in terms of a set of common or least mean square fit filter innovations as described more particularly in R. A. Iltis, "*Recursive Bayesian Algorithms for Blind Equalization*", supra. The likelihood or gaussian distribution density, $p(r(k)|d_i^{k,L}, r^{k-1})$, is readily determined from its mean given in Equation 7 below and its variance which can be determined from the data received through conventional means, namely statistical computation.

FIG. 3a is a diagrammatic drawing of a method and means for generating both an estimated signal according to equation (7) below and an updated likelihood of a data symbol given a prior sequence and received signal as discussed above.

Eventually a decision must be made as to what the true data was. The decision is made when the last time interval is past during which the data symbol could have contributed to the intersymbol interference. At time k this is the data symbol d(k−L+1). The decision on the data symbol, d(k−L+1), is found by computing the marginal probability, which requires a summation over the probabilities or metrics in Equation 5. In practice, the maximum subsequence metric in Equation 5 is selected and the corresponding data symbol, d(k−L+1), is used as the decision.

For each subsequence, $d_i^{k,L}$, a separate channel or symbol timing estimator is used. A normalized least mean square (LMS) algorithm works well and requires only vector and scalar arithmetic operations. The least mean square update for both timing, $\hat{\tau}_i(k|k)$, and channel coefficients, $\hat{f}_i(k|k)$, is given by Equation 6 below where K(k) is a conventional Kalman gain matrix and where the estimated signal, $\hat{r}_i(k|k-1)$, is given by Equation 7 below.

$$\begin{bmatrix} \hat{\tau}_i(k|k) \\ \hat{f}_i(k|k) \end{bmatrix} = \begin{bmatrix} \hat{\tau}_i(k|k-1) \\ \hat{f}_i(k|k-1) \end{bmatrix} + K(k) \begin{bmatrix} d_i^*(k) \\ d_i^*(k-1) \\ \vdots \\ d_i^*(k-L+1) \end{bmatrix} [r(k) - \hat{r}_i(k|k-1)] \quad (6)$$

$$\hat{r}_i(k|k-1) = \quad (7)$$

-continued $$\sum_{l=0}^{N_f-1} \hat{f}_{i,l}(k|k-1) \sum_{n=0}^{1} d^i_{k-1-n} g(Re\{\hat{\tau}_i(k|k-1)\} + nT)$$

In Equation 6 above, $\hat{\tau}_i(k|k)$ and $\hat{f}_i(k|k)$ represent the timing and symbol coefficient estimates respectively corresponding to the data subsequence, $d_i^{k,L}$. The estimates are then combined in a Bayesian formula to yield $\hat{\tau}_i(k+1|k)$ and $\hat{f}_i(k+1|k)$ for the next iteration.

Figure 3C:
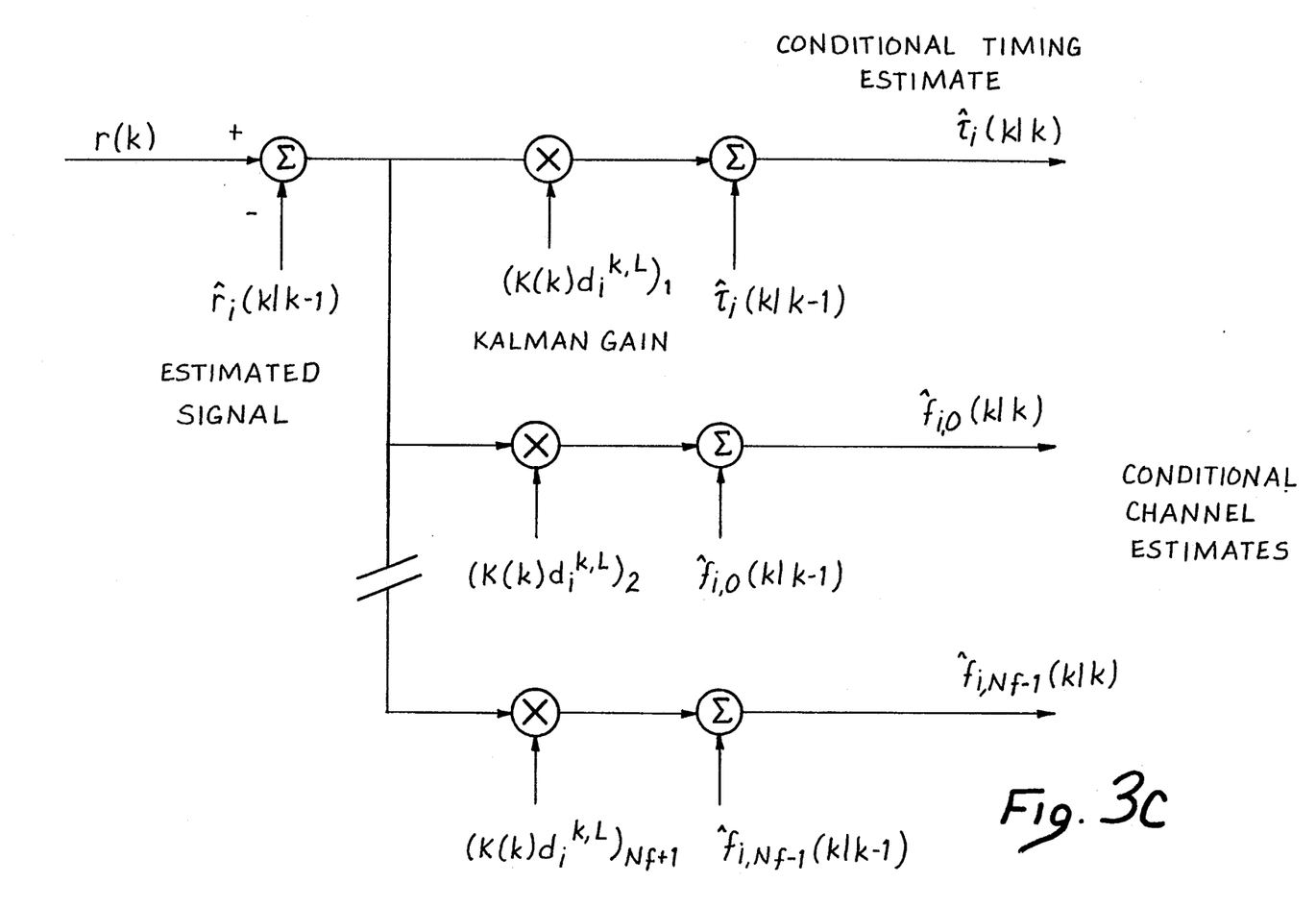
FIG. 3c is a diagrammatic drawing of a method and means for generating conditional timing and channel coefficients.

FIG. 3c is a diagrammatic drawing of a method and means for generating conditional timing and channel coefficients according to equation (6) above.

The methodology modeled by Equation 6 is virtually identical to the least mean square adaptation algorithm used in decision-feedback equalizers in existing high speed modems. However, a conventional decision feedback equalizer only generates a single update of the form shown in Equation 6, namely that corresponding to the most likely subsequence, $d_i^{k,L}$. In contrast, the Bayesian equalizer of the invention considers all possible updates corresponding to the subsequences, $d_i^{k,L}$. In the case of binary data, this amounts to $2^L$ subsequences.

Although the methodology of the invention is therefore potentially much more complex than that encountered in a conventional decision feedback equalizer, the updates modeled by the Equation 6 are generated according to the invention in parallel for each subsequence and therefore are implemented simply and at high speed in an integrated circuit chip.

The actual methodology implemented in circuitry includes several refinements to speed up overall operation. At each iteration only the N largest metrics, $p(d_i^{k,L}|r^k)$ are considered. Thus, only N channel measurement updates steps modeled from Equation 6 need be performed for each input sample. For a time division multiple access applications, four such channel estimators are believed to be sufficient.

Figure 2:
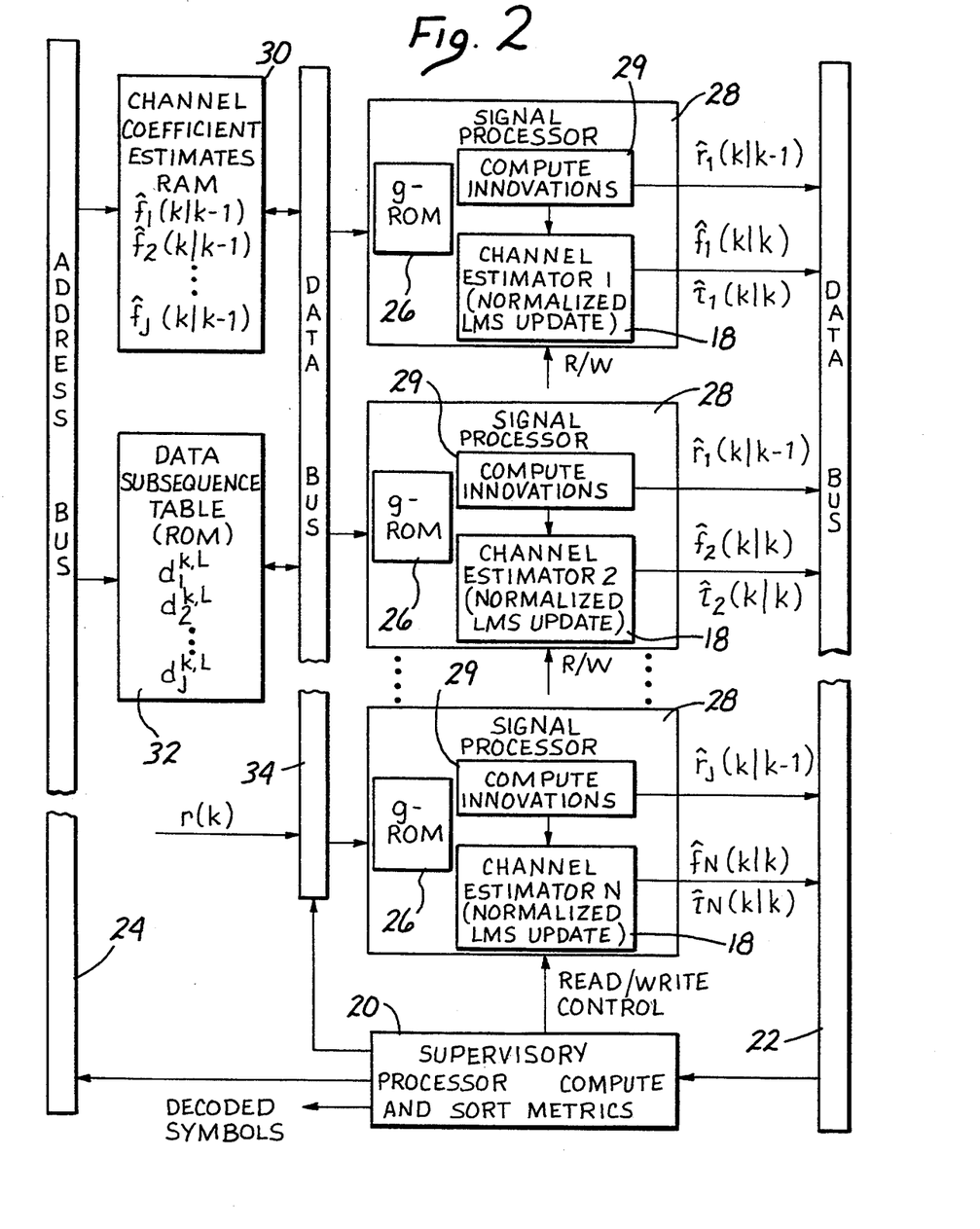
FIG. 2 is a block diagram of an integrated circuit in which the invention is implemented.

Turn now to FIG. 2 wherein a block diagram of the circuit architecture of the invention is depicted. An integrated circuit is fabricated with N parallel channel/-symbol timing estimators 18 included in N corresponding parallel signal processors 28. A digital supervisory processor 20 is also included and is coupled to data buses 22 and 34, and an address bus 24. In the embodiment of FIG. 2, processor 20 is used to update and sort the metrics in a methodology which is modeled by Equation 5 above as well as to provide overall system timing and control. It is specifically contemplated that the invention also includes an embodiment where programmable processor 20 is replaced by custom logic which fast sorts the metrics in order to select the N largest and to rapidly generate the likelihoods needed for the methodology modeled in Equation 5 above.

The data subsequence table for all possible data subsequences $d_i^{k,L}$, is stored in read only memory (ROM) 32. RAM 30 and ROM 32 are each coupled to data bus 34 to which is also coupled the received data sequences, r(k). Data bus 34 in turn is coupled to each of the parallel processors 28. Each processor 28 generates in parallel the estimated signals or $\hat{r}(k|k-1)$ and updated channel and timing estimates, $\hat{f}_i(k|k)$ and $\hat{\tau}_i(k|k)$, for the N data signals which contribute to intersymbol interference. These generated output values are then output to main data bus 22.

The proper channel coefficient estimates, $\hat{f}_i(k|k-1)$ and $\hat{\tau}_i(k|k-1)$, and data subsequences corresponding to the N largest metrics are written to each of the parallel signal processors 28 under the control of supervisory processor 20.

Processors 28 in FIG. 2 generate by a custom logic circuit 29 the estimated innovations, $r(k) - \hat{r}_i(k|k-1)$, which form the last factor in the right side of Equation 6 above for all possible subsequences of data, $d_i^{k,L}$. In the example where quadrature phase shifted keying modulation is used, there are $4^N$ subsequences in each iteration. In each signal processor 28 a read only memory (ROM) 26 is provided in each estimator to store a look-up table in order to generate the pulse function, g(t), corresponding to the known performance of transmitter or pulse generator 10 in FIG. 1. This is labeled in FIG. 2 as the g-ROM 26. The integrations or estimated signals are then used to generate the updated metrics or probabilities according to the methodology modeled by Equations 6 and 7 above.

These updated estimates are then read by supervisory processor 20 which generates one step predictions of these parameters for the next iteration according to the methodology modeled by Equation 8 below.

$$\hat{f}_i(k+1|k) = \sum_{j:\ d_j^{k,L} \in d_i^{k+1,L}} F\hat{f}_j(k|k) P(d_j^{k,N}|r^k) / \sum_{m:\ d_m^{k,L} \in d_i^{k+1,L}} P(d_m^{k,L}|r^k) \quad (8)$$

where F is a conventional matrix describing the bandwidth channel coefficient process, which can be set to an estimated value since Equation 8 is not sensitive to its true value. These one step predictions are then stored by supervisory processor 20 in channel coefficient random access memory 30.

Figure 3D:
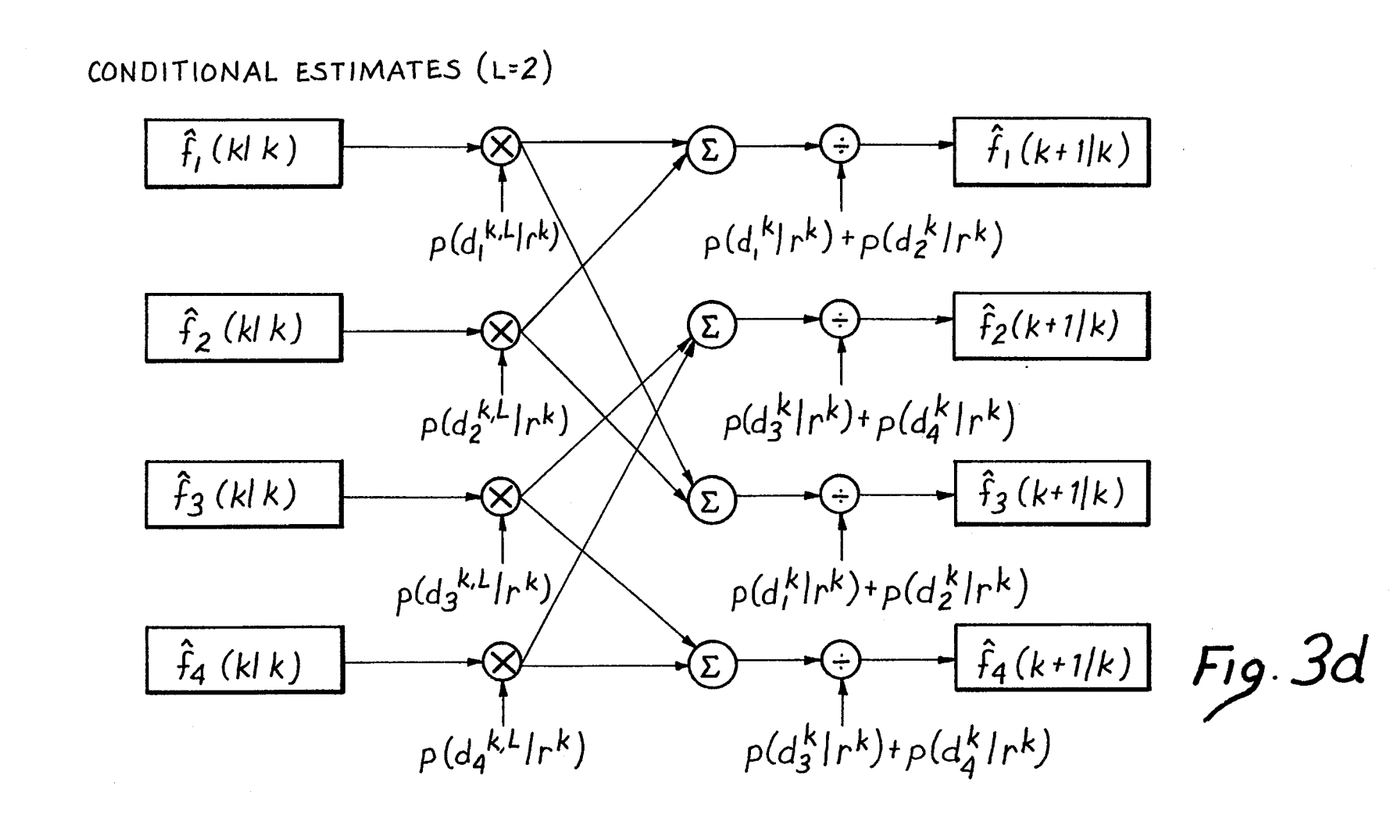
FIG. 3d is a diagrammatic drawing of a method and means for generating unconditional channel coefficients.

FIG. 3d is a diagrammatic drawing of a method and means for generating unconditional channel coefficients according to equation (8) above.

Supervisory processor 20 then generates the decoded symbols d(n) consistent with the predictions made according to Equation 5. In other words at time k, the last data symbol, $d(k-L+1)$, of the most probable one of the sequences, $d_i^{k-L+1,L}$, is chosen as the true data symbol which was transmitted. This symbol is then output as the decoded received data.

Parallel processors 28 implement the methodology and modeled by Equations 6 and 7 to generate the predicted estimated signal $\hat{r}_i(k|k-1)$, the estimated channel coefficients $\hat{f}_i(k|k-1)$, and the estimated timing coefficient $\hat{t}_i(k|k-1)$. The computations within parallel processors 28 are intensive, requiring many complex number multiplications and additions. Therefore, at least processors 28 are implemented in high speed integrated circuits in order to perform the updated estimates during a single time cycle of the supervisory processor 20. In addition the clock frequency of parallel processors 28 is much high than the clock frequency of supervisory processor 20.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the germ of the invention.

We claim:

1. (once amended) An apparatus for performing blind equalization of digital communication over a communication channel upon which data signals are received comprising:

a memory for storing every possible data subsequence in which intersymbol interference could occur and for storing updated communication channel coefficients;

a first data bus coupled to said memory for communicating said received data signals, stored data subsequences and stored updated communication channel coefficients;

a plurality of signal processors each coupled in parallel to said first data bus, each processor for generating estimated received data signals and updated estimated communication channel coefficients, each processor generating said estimated received data signals and updated estimated communication channel coefficients for one of said stored possible data subsequences;

a second data bus coupled in parallel to said plurality of signal processors for communicating said estimated data signals and updated estimated communication channel coefficients; and a central processing circuit coupled to said first and second data buses for controlling operation of said first and second data buses and said plurality of signal processors, for estimating unconditional channel coefficients, for storing said estimated unconditional channel coefficients in said memory, and for decoding said received data according to a Bayesian estimation based on said estimated unconditional channel coefficients and updated estimated communication channel coefficients for each of said stored possible subsequences, whereby said received data which is subject to data smearing is reliably decoded notwithstanding intersymbol interference and without use of training data or signaling preambles.

2. The apparatus of claim 1 wherein said central processing circuit comprises a supervisory processor and an address bus coupled to said supervisor processor and memory for communication therebetween.

3. The apparatus of claim 2 wherein said memory is comprised of a read only memory for storing said plurality of sets of data subsequences and a random access memory for temporarily storing said unconditional channel coefficient estimates.

4. (once amended) The apparatus of claim 1 wherein each of said signal processors comprises means for computing an estimated received value for each one of a predetermined number of possible data subsequences.

5. The apparatus of claim 4 wherein each said signal processor further comprises a corresponding channel estimator for computing a normalized least mean square (LMS) update of said channel coefficient estimates read from said first data bus.

6. The apparatus of claim 5 in combination with a transmitter wherein each of said signal processors further comprises a read only memory (g-ROM) for storing a corresponding pulse function, g(t), corresponding to said transmitter.

7. The apparatus of claim 4 wherein said predetermined number is four and wherein processors comprise said plurality of parallel signal processors.

8. (once amended) The apparatus of claim 1 wherein each said signal processor generates an estimated signal, $r_i(k|k-1)$, for each possible data subsequence, $d_i^{k,L}$, through a computational operation modeled by the equation:

$$\hat{r}_i(k|k-1) = \sum_{l=0}^{N_f-1} \hat{f}_{i,l}(k|k-1) \sum_{n=0}^{1} d_{k-l-n}^i g(Re\{\hat{r}_i(k|k-1)\} + nT),$$

where i, l, k, n are integer indices, i, l and n representing the number or a data sequence, and k the time interval of each symbol in each sequence, T is the period of a single data symbol, g is a function representing the data symbol pulse, f is a channel coefficient, and $d_{k-1-n}^i$ is an element from the set $d_i^k = \{d_i(k), d_i(k-1), \ldots, d_i(0)\}$ representing the ith sequence of all logically possible data sequences beginning from the start time k=0 to k.

9. (once amended) The apparatus of claim 1 wherein each of said signal processor generates said updated channel coefficient estimates for each possible data subsequence, $d_i^{k,L}$, through an operation as modeled by equation:

$$\begin{bmatrix} \hat{r}_i(k|k) \\ \hat{f}_i(k|k) \end{bmatrix} = \begin{bmatrix} \hat{r}_i(k|k-1) \\ \hat{f}_i(k|k-1) \end{bmatrix} +$$

$$K(k) \begin{bmatrix} d_i^*(k) \\ d_i^*(k-1) \\ \cdot \\ \cdot \\ \cdot \\ d_i^*(k-L+1) \end{bmatrix} [r(k) - \hat{r}_i(k|k-1)]$$

where i and k are integer indices, i representing the number of a data sequence, and k the time interval of each symbol in each sequence, L is an integer representing the number of possibly interfering data symbols, $\hat{r}$ and $\hat{f}$ are estimated timing and channel coefficients respectively, K is a Kalman gain matrix, $d_i^*(k)$ is the complex conjugate of a possible data symbol, r(k) is a received data symbol at time k, $d_i^{k,L}$ is a set $\{d_i(k), d_i(k-1), \ldots, d_i(k-L+1)\}$ possible data subsequences, and r is an estimated data symbol.

10. (once amended) The apparatus of claim 8 wherein each of said signal processor generates said updated channel coefficient estimates for each possible data subsequence, $d_i^{k,L}$ through an operation as modeled by equation:

$$\begin{bmatrix} \hat{r}_i(k|k) \\ \hat{f}_i(k|k) \end{bmatrix} = \begin{bmatrix} \hat{r}_i(k|k-1) \\ \hat{f}_i(k|k-1) \end{bmatrix} +$$

-continued $$K(k) \begin{bmatrix} d_i^*(k) \\ d_i^*(k-1) \\ \cdot \\ \cdot \\ d_i^*(k-L+1) \end{bmatrix} [r(k) - \hat{r}_i(k|k-1)]$$

where i and k are integer indices, i representing the number of a data sequence, and k the time interval of each symbol in each sequence, L is an integer representing the number of possibly interfering data symbols, $\hat{\tau}$ and $\hat{f}$ are estimated timing and channel coefficients respectively, K is a Kalman gain matrix, $d_i^*(k)$ is the complex conjugate of a possible data symbol, r(k) is a received data symbol at time k, $d_i^{k,L}$ is a set $\{d_i(k), d_i(k-1), \ldots, d_i(k-L+1)\}$ possible data subsequences, and r is an estimated data symbol.

11. (once amended) The apparatus of claim 1 wherein for each received data signal, r(k), said central processing circuit operates to generate a likelihood, $P(d_i^{k,L}|r^k)$, of having received said data signal, r(k), given a possible transmitted data sequence, $d_i^{k,L}$, and given all prior data signals received, $r^{k-1}$, for each possible data subsequence, $d_i^{k,L}$, as modeled by the recursive equation:

$$P(d_i^{k,L}|r^k) = (1/c)p[r(k)|d_i^{k,L}, r^{k-1}] \sum_{j: d_j^{k+1} \in d_i^{k,L}} P(d_j^{k-1,L}|r^{k-1})$$

where c is a normalization constant, $p(r(k)|d_i^{k,L},r^{k-1})$ is the Gaussian distribution density, i, j and k are integer indices, i and j representing the number of a data sequence, and k the time interval of each symbol in each sequence, L is an integer representing the number of possibly interfering data symbols, and $d_i^{k,L}$ is a set $\{d_i(k), d_i(k-1), \ldots, d_i(k-L+1)\}$ possible data subsequences, 12. (once amended) The apparatus of claim 11 wherein said central processing circuit operates to update the metric that the probability that the possible data subsequence $d_i^{k,L}$ has been received given that the data sequence $r^k$ was received for each possible data subsequence, $d_i^{k,L}$, as modeled by the equation:

$$P(d_i^{k,L}|r^k) = (1/c)p[r(k)|d_i^{k,L}, r^{k-1}] \sum_{j: d_j^{k+1} \in d_i^{k,L}} P(d_j^{k-1,L}|r^{k-1})$$

where c is a normalization constant, $p(r(k)|d_i^{k,L},r^{k-1})$ is the Gaussian distribution density, i, j and k are integer indices, i and j representing the number of a data sequence, and k the time interval of each symbol in each sequence, L is an integer representing the number of possibly interfering data symbols, and $d_i^{k,L}$ is a set $\{d_i(k), d_i(k-1), \ldots, d_i(k-L+1)\}$ possible data subsequences.

13. (once amended) The apparatus of claim 12 wherein each of said signal processors functions to generate conditional channel estimate, $\hat{\tau}(k|k)$ and $\hat{f}(k|k)$, for each possible data subsequence, $d_i^{k,L}$, as modeled by the equation:

$$\begin{bmatrix} \hat{\tau}_i(k|k) \\ \hat{f}_i(k|k) \end{bmatrix} = \begin{bmatrix} \hat{\tau}_i(k|k-1) \\ \hat{f}_i(k|k-1) \end{bmatrix} +$$

$$K(k) \begin{bmatrix} d_i^*(k) \\ d_i^*(k-1) \\ \cdot \\ \cdot \\ d_i^*(k-L+1) \end{bmatrix} [r(k) - \hat{r}_i(k|k-1)]$$

where i and k are integer indices, i representing the number of a data sequence, and k the time interval of each symbol in each sequence, L is an integer representing the number of possibly interfering data symbols, $\hat{\tau}$ and $\hat{f}$ are estimated timing and channel coefficients respectively, K is a Kalman gain matrix, $d_i^*(k)$ is the complex conjugate of a possible data symbol, r(k) is a received data symbol at time k, $d_i^{k,L}$ is a set $\{d_i(k), d_i(k-1), \ldots, d_i(k-L+1)\}$ possible data subsequences, and r is an estimated data symbol.

14. The apparatus of claim 13 wherein said central processing circuit functions in preparation for receipt of the next data sample, r(k+1), for each next possible data subsequence, $d_i^{k-1,L}$, to generate the unconditional channel estimate, $\hat{f}_i(k+1|k)$, for each possible data subsequence, $d_i^{k,L}$, as modeled by the equation:

$$\hat{f}_i(k+1|k) = \sum_{j: d_j^{k,L} \in d_i^{k+1,L}} F\hat{f}_j(k|k)P(d_j^{k,N}|r^k) / \sum_{m: d_m^{k,L} \in d_i^{N+1,L}} P(d_m^{k,L}|r^k)$$

where i, j, m and k are integer indices, i, m and j representing the number of a data sequence, and k the time interval of each symbol in each sequence, L is an integer representing the number of possibly interfering data symbols, and $d_i^{k,L}$ is an element of the set $\{d_i(k), d_i(k-1), \ldots, d_i(k-L+1)\}$ of all possible data subsequences, and $P(d_i^{k,L}|r^k)$ is the likelihood of having received said data signal, r(k), given a possible transmitted data sequence, $d_i^{k,L}$, and given all prior data signals received, $r^{k-1}$, for each possible data subsequence, $d_i^{k,L}$ and F is a matrix describing bandwidth channel coefficients set at an estimated value.

15. A method for communicating digital information in a communication channel subject to intersymbol interference by using blind equalization comprising the steps of receiving a sample r(k);

determining the likelihood of having received said sample given a possible data sample sequence and given a sequence of prior received samples, said likelihood being $p(r(k)|d_i^{k,L}, r^{k-1})$ for each possible data subsequence, $d_i^{k,L}$;

updating the probability that the sequence of data signals possibly received given the received samples including the presently received sample, said updated metric being $P(d_i^{k,L}|r^k)$;

conditionally estimating updated channel coefficients corresponding to said communication channel for each possible data subsequence of possibly intersymbol interfering samples;

unconditionally estimating channel coefficients for said communication channel for each next possible subsequence, $d_i^{k+1,L}$, for every possible intersymbol interfering received sample for the next received data sample; and receiving the next data sample, $r(k+1)$, whereby data may be decoded notwithstanding intersymbol interference without the use of data preambles or training data.

16. The method of claim 15 where said step of updating said metric is performed for each possible data subsequence, $d_i^{k,L}$, as modeled by the recursive equation:

$$P(d_i^{k,L}|r^k) = (1/c)p[r(k)|d_i^{k,L}, r^{k-1}] \sum_{j:\, d_j^{k+1,L} \in d_j^{k,L}} P(d_j^{k-1,L}|r^{k-1})$$

where c is a normalization constant, $p(r(k)|d_i^{k,L}, r^{k-1})$ is the Gaussian distribution density, i,j and k are integer indices, i and j representing the number of a data sequence, and k the time interval of each symbol in each sequence, L is an integer representing the number of possibly interfering data symbols, and $d_i^{k,L}$ is a set $\{d_i(k), d_i(k-1), \ldots, d_i(k-L+1)\}$ possible data subsequences.

17. (once amended) The method of claim 16 wherein said step of conditionally estimating said updated channel coefficients is performed for each possible data subsequence, $d_i^{k,L}$, as modeled by the equation:

$$\begin{bmatrix} \hat{\tau}_i(k|k) \\ \hat{f}_i(k|k) \end{bmatrix} = \begin{bmatrix} \hat{\tau}_i(k|k-1) \\ \hat{f}_i(k|k-1) \end{bmatrix} + K(k) \begin{bmatrix} d_i^*(k) \\ d_i^*(k-1) \\ \vdots \\ d_i^*(k-L+1) \end{bmatrix} [r(k) - \hat{r}_i(k|k-1)]$$

where i and k are integer indices, i representing the number of a data sequence, and k the time interval of each symbol in each sequence, L is an integer representing the number of possibly interfering data symbols, $\hat{\tau}$ and $\hat{f}$ are estimated timing and channel coefficients respectively, K is a Kalman gain matrix, $d_i^*(k)$ is the complex conjugate of a possible data symbol, $r(k)$ is a received data symbol at time k, $d_i^{k,L}$ is a set $\{d_i(k), d_i(k-1), \ldots, d_i(k-L+1)\}$ possible data subsequences, and r is an estimated data symbol.

18. (once amended) The method of claim 17 wherein said step of unconditionally estimating said channel coefficient is performed for each possible data subsequence, $d_i^{k,L}$, as modeled by the equation:

$$\hat{f}(k+1|k) = \sum_{j:\, d_j^{k,L} \in d_i^{k+1,L}} F\hat{f}_j(k|k)P(d_j^{k,N}|r^k) \Big/ \sum_{m:\, d_m^{k,L} \in d_i^{N+1,L}} P(d_m^{k,L}|r^k)$$

where i, j, m and k are integer indices, i, m and j representing the number of a data sequence, and k the time interval of each symbol in each sequence, L is an integer representing the number of possibly interfering data symbols, and $d_i^{k,L}$ is an element of the set $\{d_i(k), d_i(k-1), \ldots, d_i(k-L+1)\}$ of all possible data subsequences, and $P(d_i^{k,L}|r^k)$ is the likelihood of having received said data signal, $r(k)$, given a possible transmitted data sequence, $d_i^{k,L}$, and given all prior data signals received, $r^{k-1}$, for each possible data subsequence, $d_i^{k,L}$ and F is a matrix describing bandwidth channel coefficients set at an estimated value.

19. (once amended) The method of claim 15 further comprising the step of decoding said information from said sample $r(fk)$ by selecting the oldest received data symbol from the most probable data subsequence when said oldest received data symbol can no longer be involved in intersymbol interference.

20. The method of claim 15 wherein said steps of updating the probability that the sequence of data signals possibly received given the received samples including the presently received sample, and said step of conditionally estimating updated channel coefficient corresponding to said communication channel for each possible data subsequence of possibly intersymbol interfering samples are simultaneously performed for each possible data subsequence, $d_i^{k,L}$.

* * * * *